(No Model.)
F. B. CLEMENTS.
HUB AND AXLE.
No. 425,754. Patented Apr. 15, 1890.
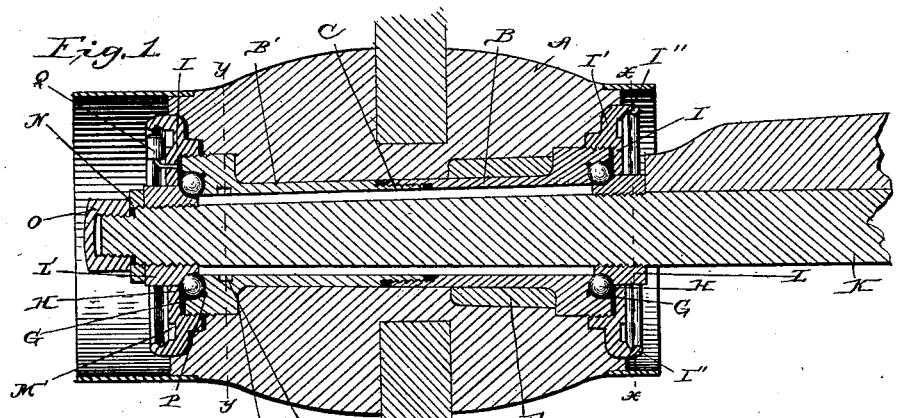
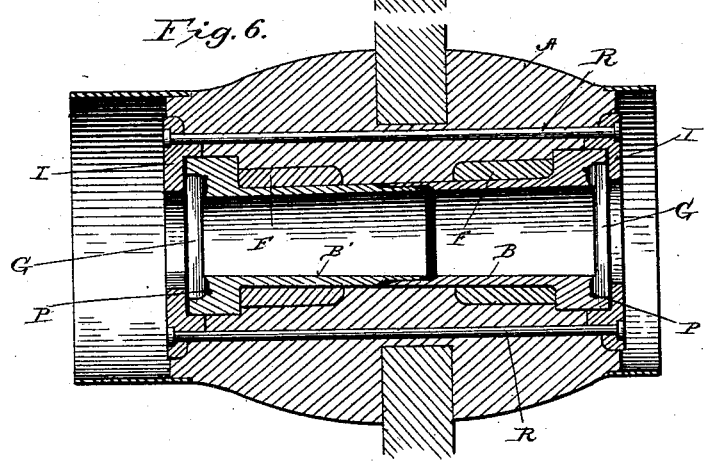
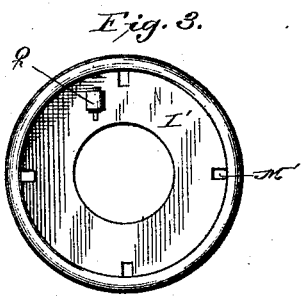 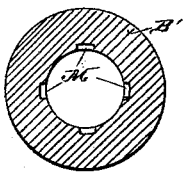 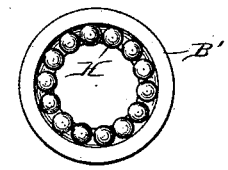
Witnesses
Harry S. Rohrer
Lee F. Maller
Inventor
F. B. Clements
By his Attorneys
Niles & Greene

UNITED STATES PATENT OFFICE.

FRANK B. CLEMENTS, OF TUSCALOOSA, ALABAMA.

HUB AND AXLE.

SPECIFICATION forming part of Letters Patent No. 425,754, dated April 15, 1890.

Application filed August 23, 1889. Serial No. 321,691. (No model.)

*To all whom it may concern:*

Be it known that I, FRANK B. CLEMENTS, a resident of Tuscaloosa, in the county of Tuscaloosa and State of Alabama, have invented certain new and useful Improvements in Hubs and Axles; and I do hereby declare the following to be a full, clear, and exact description of the invention, such as will enable others skilled in the art to which it pertains to make and use the same.

The principal object of this invention is to secure for ordinary vehicle-wheels the advantages of self-lubricating "ball-bearings" without materially diminishing the facility with which they may be removed from the axle and replaced thereon. The devices for accomplishing this end secure other desirable objects, as will hereinafter appear.

In the accompanying drawings, Figure 1 is a central longitudinal section of a wheel-hub provided with my devices. Fig. 2 shows the part B' detached, looking from the left in Fig. 1, the balls being in position. Fig. 3 is a like view of the part I'. Fig. 4 is a section on the line $xx$, Fig. 1. Fig. 5 is a section on the line $yy$, Fig. 1. Fig. 6 is a partial view similar to Fig. 1, showing a slight modification in construction.

In Figs. 1, 2, 3, 4, and 5 of the drawings, A is an ordinary wheel-hub, and B B' a two-part axle-box secured in the axis thereof. Both these parts are enlarged at the outer end, and they are overlapped near the middle of the hub and united by screw-threads C, which serve to draw the shoulders D D of the enlarged ends firmly against the corresponding shoulders E E' of the hub. The part B is provided with the usual feathers F to prevent its rotation in the hub, and the part B' is provided with internal recesses M M, so that it may be rotated with the aid of a suitable wrench. At the outer end of each of the parts the inner angle is cut away to form a groove G to receive a series of balls H. The depth and the radial width of the groove are both slightly less than the diameter of the balls, so that each of the latter projects beyond both the end face and the inner cylindrical face of the axle-box. The balls are retained in place by annular caps I I', covering a little more than the outer half of each ball, and provided with annular internally-threaded flanges J J', that enter suitable recesses in the ends of the hubs and engage, respectively, external threads upon the parts B B'. The hub is used upon an axle K, of cylindrical or slightly-conical form and smaller than the cavity in which it lies. At the ends of the hub the axle bears internally-threaded collars L L', each closely fitting the central opening in the corresponding cap and each having at the external angle of its inner end an annular groove of nearly quadrantal cross-section to fit against that part of the balls not covered by the cap and the part B or B'. Each collar is non-circular at its outer end in order that it may be conveniently rotated by a wrench. Upon the axle outside of and resting against the collar L' is a washer N, and against this is screwed an axle-capping nut O. There is a space between the bottom of the nut-cavity and the end of the axle, between the inner faces of the caps I I' and both the hub and the ends of the axle-box, and also between the meeting faces of the middle overlapping parts of the axle-box. There is, further, an annular depression P in the bottom of each ball-groove G. This latter, the central space between the axle and the axle-box, and the spaces between the ends of the axle-box and the caps I I', all serve as receptacles for a lubricant, which is introduced through a small oil-cup Q. Now, the part B being first forced into the hub, the part B' is inserted and screwed firmly against the shoulder E', clamping both parts securely in place. The balls are then placed in position and secured by the caps I I', whose distance from the edge of the ball-groove in the box is not sufficient to allow the balls to escape. The whole may now be handled like an ordinary hub, it being necessary to separate the parts only at long intervals when the ball-grooves require cleaning. The hub may now be placed upon the axle and pushed back until the balls meet the collar L. The collar L' is then screwed up against the outer balls, the washer added, and the nut O screwed against the washer; when, if the lubricant has been inserted, the devices are ready for use.

The balls are preferably of rolled steel, and all the faces against which they bear are chilled or case-hardened.

While all the working parts are well protected against sand and dust, it is to be observed that the large spaces connecting with the ball-cavities and the fact that the surfaces of these cavities all incline toward one or both these spaces during each revolution of the wheel cause any dust that may gain admission to speedily work out of the path of the balls into these spaces.

Any wear of the outer balls is compensated by advancing the collar L' upon its thread, and in such case its inner end passes within the cavity of the axle-box. Such advance of the collar L', pressing the wheel along upon the axle, at the same time compensates wear upon the inner balls; but, if preferred, this latter compensation may be effected by rotation of the collar L.

The caps I I' have an outwardly-projecting flange I'' to be grasped by the fingers, and for convenience this may be externally milled.

The collar L may evidently be formed integrally with or rigidly attached to the axle, and the threads within the collar L' are not indispensable; but I prefer the construction shown.

In Fig. 6 the two parts of the axle-box overlap, but are not screw-threaded, the part B' is feathered like the part B, the recesses M and the flanges I'' are omitted, and the caps I I' and the intermediate parts B B' are drawn together and secured to the hub by small bolts R R, passing through the hub from end to end. In either form all end motion and rattling are effectually prevented by the same adjustment of the outer collar.

What I claim is—

1. The combination, with the axle-box externally threaded at each end and provided with the groove at the internal angle of each end, of the balls resting in said groove and the adjustable caps screwed upon the box and against the balls, whereby the balls may be retained in the groove and the adjustment be preserved whether the box be upon the axle, off the axle, or in process of removal or replacement.

2. The combination, with the hub and the axle-box provided with the grooves at the inner angles of its ends, of the annular series of balls resting in said grooves and projecting within the box, the removable ball-retaining caps adjustable to compensate wear, and the axle having the adjustable collars to form bearings for the exposed portions of the balls, substantially as set forth.

3. The combination of the hub A, the two-part axle-box secured therein and provided with the ball-grooves at its ends, the balls lying in said grooves and projecting within the box, the adjustable caps I I', screwed upon the box and resting against the balls, the oil-cups secured to the caps and supplying oil to the balls, and the axle having the adjustable collars forming bearings for the parts of the balls not covered by the grooves and caps.

In testimony whereof I have signed this specification in the presence of two subscribing witnesses.

F. B. CLEMENTS.

Witnesses:
WALLACE GREENE,
HARRY S. ROLVEER.